(12) United States Patent
Mogilka et al.

(10) Patent No.: US 12,292,001 B2
(45) Date of Patent: May 6, 2025

(54) PROPULSIVE ASSEMBLY FOR AIRCRAFT

(71) Applicants: Airbus SAS, Blagnac (FR); Airbus Operations SAS, Toulouse (FR)

(72) Inventors: Philippe Mogilka, Blagnac (FR); Lionel Czapla, Toulouse (FR); Alexis Pissavin, Blagnac (FR)

(73) Assignees: Airbus SAS, Blagnac (FR); Airbus Operations SAS, Toulouse (FR)

( * ) Notice: Subject to any disclaimer, the term of this patent is extended or adjusted under 35 U.S.C. 154(b) by 41 days.

(21) Appl. No.: 18/476,586

(22) Filed: Sep. 28, 2023

(65) Prior Publication Data
US 2024/0109668 A1    Apr. 4, 2024

(30) Foreign Application Priority Data

Sep. 30, 2022  (FR) ...................................... 2209992

(51) Int. Cl.
| | |
|---|---|
| *F02C 7/22* | (2006.01) |
| *B64D 37/30* | (2006.01) |
| *F02C 3/20* | (2006.01) |
| *F02C 3/22* | (2006.01) |
| B64D 27/12 | (2006.01) |
| B64D 29/02 | (2006.01) |
| B64D 29/08 | (2006.01) |

(52) U.S. Cl.
CPC .............. *F02C 7/222* (2013.01); *B64D 37/30* (2013.01); *F02C 3/20* (2013.01); *F02C 3/22* (2013.01); B64D 27/12 (2013.01); B64D 29/02 (2013.01); B64D 29/08 (2013.01)

(58) Field of Classification Search
CPC ... F02C 7/222; F02C 3/20; F02C 3/22; B64D 37/30
See application file for complete search history.

(56) References Cited

U.S. PATENT DOCUMENTS

| | | |
|---|---|---|
| 4,062,184 A | 12/1977 | Hagen |
| 9,790,862 B2 | 10/2017 | Fuller et al. |
| 2017/0037783 A1 | 2/2017 | Ryon et al. |
| 2022/0099299 A1* | 3/2022 | Carrotte ..................... F02C 7/04 |
| 2022/0307428 A1 | 9/2022 | Sibbach et al. |
| 2023/0212991 A1* | 7/2023 | Wang ......................... F02C 3/24 |
| | | 60/39.23 |

FOREIGN PATENT DOCUMENTS

| | | |
|---|---|---|
| DE | 2413507 A1 | 10/1975 |
| EP | 1736651 B1 | 10/2010 |

OTHER PUBLICATIONS

French Search Report for corresponding French Patent Application No. 2209992 dated Apr. 18, 2023.

* cited by examiner

*Primary Examiner* — Todd E Manahan
*Assistant Examiner* — Alyson Joan Harrington
(74) *Attorney, Agent, or Firm* — Greer, Burns & Crain, Ltd.

(57) ABSTRACT

A propulsive assembly for an aircraft with an engine system with a core in a casing and having a combustion chamber and a turbine with blades, a supply line supplying dihydrogen, an injector manifold equipped with injectors which dip into the combustion chamber, and a distribution network with several bypass lines distributed around the casing, a rear manifold connected to the supply line and to the bypass lines and a front manifold connected to the bypass lines and to the injector manifold, in which the rear manifold is at the rear of the turbine and the front manifold is at the front of the turbine.

8 Claims, 4 Drawing Sheets

PROPULSIVE ASSEMBLY FOR AIRCRAFT

CROSS-REFERENCES TO RELATED APPLICATIONS

This application claims the benefit of French Patent Application Number 2209992 filed on Sep. 30, 2022, the entire disclosure of which is incorporated herein by way of reference.

FIELD OF THE INVENTION

The present invention relates to a propulsive assembly for an aircraft, said propulsive assembly comprising an engine system such as a turboprop engine, a dihydrogen line connected to a dihydrogen tank, a dihydrogen distribution network which is connected to the dihydrogen line and which supplies the combustion chamber of the engine system with said dihydrogen at injectors in which the distribution network comprises several lines disposed in parallel to one another around the turbine of the engine system. The invention also relates to an aircraft comprising at least one such propulsive assembly.

BACKGROUND OF THE INVENTION

In order to move, an aircraft conventionally comprises at least one propulsive assembly comprising an engine system such as a turboprop engine. Such an engine system comprises a core which is enclosed in a casing and which comprises, among other things, from upstream to downstream, a compressor, a combustion chamber and a turbine. The engine system also comprises a propeller driven in rotation by the core. The compressor and the turbine each have blades which are fixed to a rotary shaft. The propulsive assembly also comprises a frame which is fixed to a structure of the wing of the aircraft and thus constitutes an attachment pylon under the wing.

To limit the pollution due to the use of kerosene, dihydrogen is envisaged being used as fuel in the combustion chamber.

This dihydrogen is brought from a tank to the combustion chamber by a dihydrogen line which extends at least partly in the propulsive assembly. Because of the structure of the propulsive assembly and its position under the wing and to the front of the wing, the dihydrogen line passes through the frame in coming from the wing and thus runs from the rear to the front to the combustion chamber.

To limit the impact of the temperature of the core on the dihydrogen line, the latter runs outside the casing to rejoin the combustion chamber through the casing.

In the event of an incident on the engine system, it may be that some blades of the turbine or of the compressor become detached from the shaft and, by virtue of their speed, they pass through the casing at the risk of cutting the dihydrogen line.

SUMMARY OF THE INVENTION

One object of the present invention is to propose a propulsive assembly which comprises a network of several lines disposed in parallel to one another around the turbine. Thus, in the event of breakage of all or part of a blade of the turbine, all the lines of the network are not cut simultaneously which makes it possible to limit the quantity of dihydrogen which leaks.

To this end, a propulsive assembly for an aircraft is proposed comprising:
a nacelle composed of cowls,
an engine system housed in the nacelle, and comprising a core enclosed in a casing and having a combustion chamber and a turbine provided with blades rotating about a longitudinal axis,
a supply line intended to convey dihydrogen and winding outside the casing to the rear of the turbine,
an injector manifold arranged around the casing and the combustion chamber and equipped with injectors which dip into the combustion chamber through the casing, and
a distribution network which comprises several bypass lines distributed angularly around the casing, a rear manifold fluidically connected to the supply line and to each bypass line and a front manifold fluidically connected to each bypass line and to the injector manifold, in which the rear manifold is at the rear of the turbine and the front manifold is at the front of the turbine.

With such an arrangement, a blade of the turbine which might become partially or entirely detached will not cut all the lines of the distribution network, which makes it possible to limit the quantity of dihydrogen which leaks. Furthermore, in as much as the diameters of the lines of the distribution network are smaller than the diameter of the dihydrogen line, in case of breakage, the flow of dihydrogen released is weaker and the concentration of dihydrogen remains reduced, below admissible thresholds.

Advantageously, the turbine comprises several rotary discs and each disc comprises several blades and the separation between two adjacent bypass lines is at least equal to a third of the diameter of the largest disc of the turbine.

According to a particular embodiment, the front manifold is composed of the injector manifold and the front and rear manifolds and the bypass lines are housed inside the cowls of the nacelle.

According to a particular embodiment, the front and rear manifolds and the bypass lines are disposed outside the cowls, the supply line is housed inside the cowls and has a radially angled section which passes through one of the cowls to rejoin the rear manifold, and the propulsive assembly comprises a transfer line which fluidically links the front manifold and the injector manifold through one of the cowls of the nacelle.

Advantageously, the propulsive assembly comprises an outer cowl fixed onto the outside of the cowls of the nacelle by enclosing the front and rear manifolds and the bypass lines, and the propulsive assembly has an air intake at the front of the outer cowl, between the latter and the cowls of the nacelle and an outlet at the rear of the outer cowl, between the latter and the cowls of the nacelle.

Advantageously, the propulsive assembly comprises at least one gutter fixed to the outermost cowl and inside the latter, said at least one gutter extends over at least the length of the turbine and at least one bypass line is housed in said at least one gutter.

The invention also proposes an aircraft comprising a wing, a dihydrogen tank and at least one propulsive assembly according to one of the preceding variants in which the propulsive assembly is fixed under the wing and in which the supply line is fluidically connected to the dihydrogen tank.

BRIEF DESCRIPTION OF THE DRAWINGS

The features of the invention mentioned above, and others, will become more clearly apparent on reading the following description of an exemplary embodiment, said description being given in relation to the attached drawings, in which.

DETAILED DESCRIPTION OF THE PREFERRED EMBODIMENTS

Figure 1:
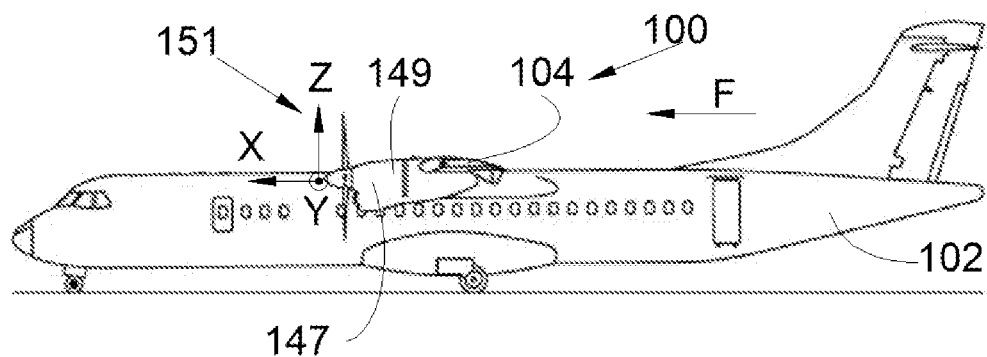
FIG. 1 is a side view of an aircraft comprising a propulsive assembly according to the invention.

In the following description, the terms relating to a position are taken with reference to an aircraft in position of advance, that is to say as it is represented in FIG. 1 in which the arrow F shows the direction of advance of the aircraft.

In the following description, and by convention, X denotes the longitudinal axis of the engine system which is parallel to the longitudinal axis of the aircraft oriented positively towards the front in the direction of advance of the aircraft, Y denotes the transverse axis which is horizontal when the aircraft is on the ground, and Z denotes the vertical axis or vertical height when the aircraft is on the ground, these three axes X, Y and Z being mutually orthogonal.

FIG. 1 shows an aircraft 100 which has a fuselage 102 on either side of which is fixed a wing 104. Under each wing 104 there is fixed at least one propulsive assembly 151 which comprises a nacelle 149 composed of cowls 147 forming an aerodynamic outer surface.

Figure 2:
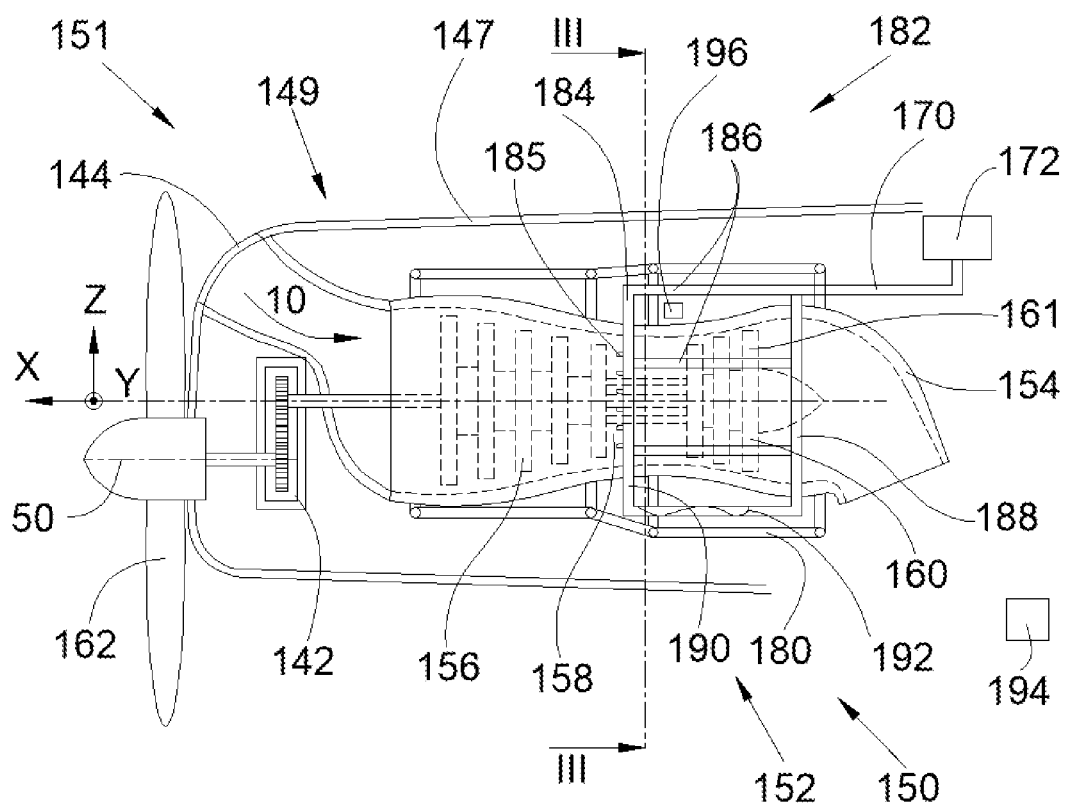
FIG. 2 is a schematic representation from the side and in cross section of the propulsive assembly according to the invention with its engine system.

FIG. 2 shows the propulsive assembly 151 which also comprises an engine system 150 which is represented schematically. The propulsive assembly 151 comprises a frame 180 which ensure the fixing of the propulsive assembly 151 to a structure of the wing 104 and constitutes an attachment pylon. In the embodiment of the invention presented in FIG. 2, the frame 180 takes the form of a cage composed, among other things, of beams fixed to one another. The frame 180 is fixed to the structure of the wing by fixing means known to the person skilled in the art. The frame 180 and the engine system 150 are housed inside the nacelle 149.

In the embodiment of the invention presented in FIG. 2, the engine system 150 is a turboprop engine which comprises a core 152 which is enclosed in a casing 154. In the embodiment of the invention presented in FIG. 2, the casing 154 is housed inside the frame 180 forming a cage and it is fixed therein by any appropriate means known to the person skilled in the art.

Outside air enters into the nacelle 149 through an aperture 144 provided in the cowls 147 at the front of the nacelle 149. Inside the nacelle 149, the stream of primary air 10 enters into the core 152 to supply a combustion chamber 158 with dioxygen.

The casing 154 is thus open at the front to allow the introduction of the primary stream 10 into the core 152 and open at the rear to allow the exhausting of the gases from the combustion through a nozzle. The core 152 comprises, from upstream to downstream, a compressor 156, a combustion chamber 158 and a turbine 160. The compressor 156 and the turbine 160 are provided with blades 161 rotating about the longitudinal axis X.

The primary stream 10 thus passes in succession through the compressor 156 where it is compressed before being injected into the combustion chamber 158 where it is mixed with the fuel. The gases deriving from the combustion then pass through the turbine 160 and drive it in rotation. The turbine 160 then in turn drives the compressor 156 in rotation and the gases are then injected at the rear.

In the case of a turboprop engine, the engine system 150 comprises a propeller 162 which is at the front and driven in rotation by the turbine 160. In the embodiment of the invention presented here, the engine system 150 also comprises a speed box 142 mounted between the turbine 160 and the propeller 162 which turns about an axis of rotation 50 parallel to the longitudinal axis X and which is here offset with respect to the longitudinal axis X.

The propulsive assembly 151 also comprises a supply line 170 which makes it possible to convey dihydrogen from a dihydrogen tank 172 of the aircraft 100. The supply line 170 thus winds from the rear of the nacelle 149 outside the casing 154 to the rear of the turbine 160.

The propulsive assembly 151 also comprises an injector manifold 184 arranged around the casing 154 and the combustion chamber 158 and equipped with injectors 185 which dip into the combustion chamber 158 through the casing 154.

The propulsive assembly 151 also comprises a distribution network 182 which is fluidically connected between the supply line 170 and the injector manifold 184.

The distribution network 182 comprises several bypass lines 186 which are distributed angularly outside the casing 154 about the longitudinal axis X and extend in parallel to one another along the turbine 160.

The distribution network 182 comprises a rear manifold 188 which is fluidically connected to the supply line 170 and to each bypass line 186 and a front manifold 190 which is fluidically connected to each bypass line 186 and to the injector manifold 184. Each manifold 188, 190 takes the form of a line which is here globally in the form of a circular arc and which is inscribed in a plane at right angles to the longitudinal axis X.

The rear manifold 188 is at the rear of the turbine 160 and the front manifold 190 is at the front of the turbine 160 on the longitudinal axis X.

Thus, the dihydrogen arrives via the supply line 170, is distributed through the bypass lines 186 at the rear manifold 188 to flow along the turbine 160 before rejoining the front manifold 190 and the injector manifold 184 where it is injected into the combustion chamber 158 by the injectors 185.

In the event of an incident on the engine system 150, it may be that all or part of a blade 161 of the turbine 160 becomes detached and passes through the casing 154 at the risk of cutting some of the bypass lines 186 which pass close to the turbine 160. The presence of several bypass lines 186 accordingly reduces the risk of them all being cut by the blade 161, which makes it possible to limit the quantity of dihydrogen which leaks. It is thus preferable to put in place more than one bypass line 186.

Furthermore, by multiplying the number of bypass lines 186, their diameter can be reduced while ensuring the passage of a same volume of dihydrogen with a single line of larger diameter.

The number of bypass lines 186 is at least equal to two, but, of course, a greater number makes it possible to reduce the risk of all the bypass lines 186 being cut. It is also preferable to angularly space apart as best as possible the bypass lines 186 to maximize the space between two adjacent bypass lines 186.

Conventionally, the turbine 160 comprises several rotary discs and each disc comprises several blades 161. Generally, when a blade 161 breaks, the largest dimension of the debris is equal to a third of the diameter of the disc from which said blade 161 originates. Thus, preferentially, the separating between two adjacent bypass lines 186 is at least equal to a third of the diameter of the largest disc of the turbine 160.

Figure 3:
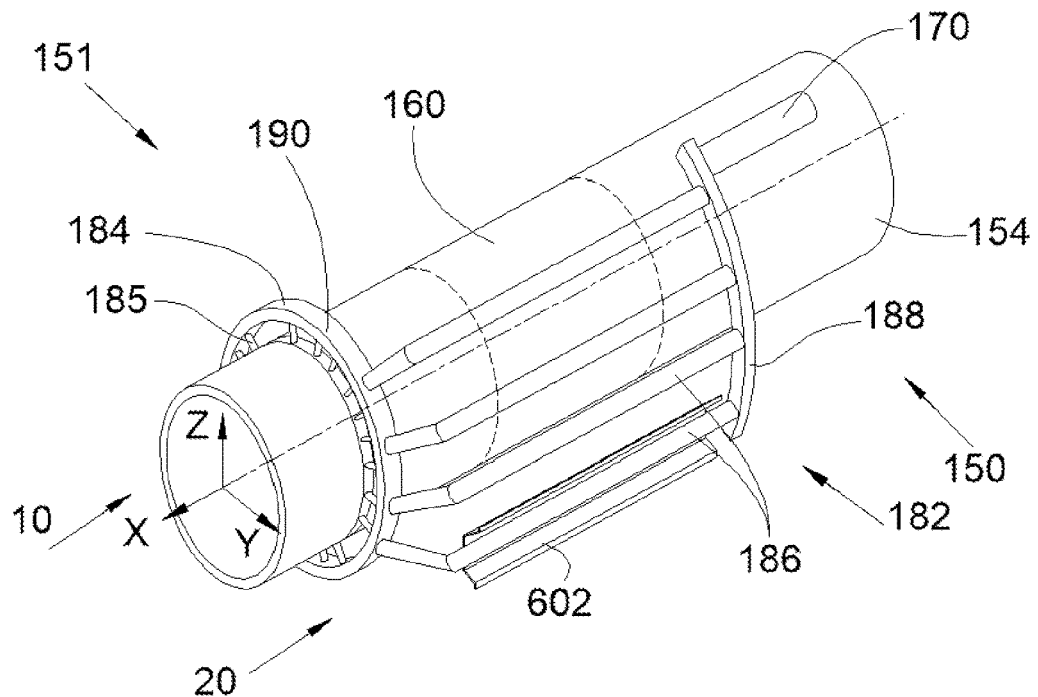
FIG. 3 is a schematic and perspective representation of a propulsive assembly according to a first embodiment of the invention.

FIG. 3 shows the propulsive assembly 151 according to a first embodiment of the invention. The zone corresponding to the turbine 160 is shown by the dotted lines on the casing 154.

In the embodiment of the invention represented in FIG. 3, the front manifold 190 is composed of the injector manifold 184 and each bypass line 186 here has an L-shaped form, the large branch of which extends on the longitudinal axis X from the rear manifold 188 and the small branch of which extends in a radial direction with respect to the longitudinal axis X to rejoin the front manifold 190.

This embodiment is of particular interest when the front and rear manifolds 188 and 190 and the bypass lines 186 are housed inside the cowls 147 of the nacelle 149.

Figure 4:
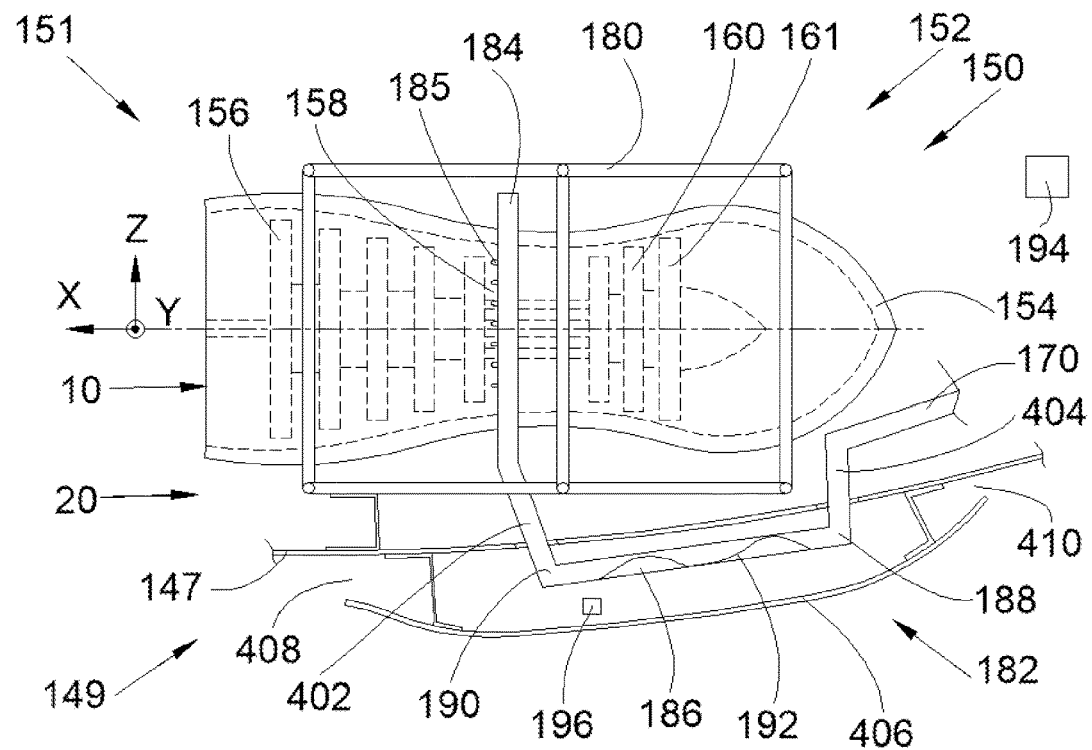
FIG. 4 is a schematic and top view representation of a propulsive assembly according to a second embodiment of the invention.
Figure 5:
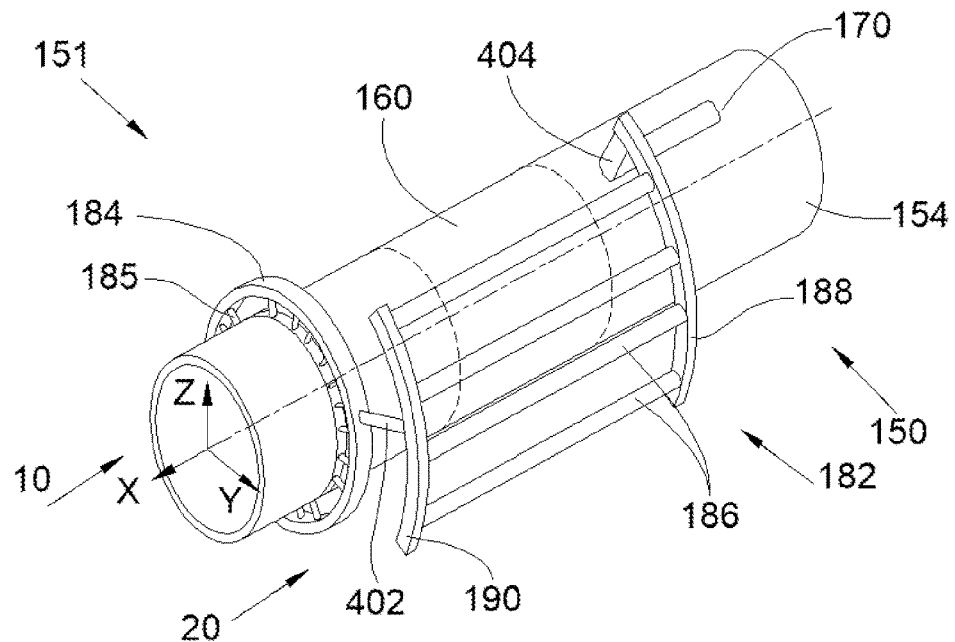
FIG. 5 is a schematic and perspective representation of the propulsive assembly of FIG. 4.

In the embodiment of the invention represented in FIG. 4 and in FIG. 5, the front manifold 190 is distinct from the injector manifold 184 and they are linked to one another by a transfer line 402 which fluidically links the front manifold 190 and the injector manifold 184.

This embodiment is of particular interest when the front and rear manifolds 188 and 190 and the bypass lines 186 are disposed outside the cowls 147 of the nacelle 149.

In this embodiment, the supply line 170 which is housed inside the cowls 147 has a radially angled section 404 which passes through one of the cowls 147 to rejoin the outside of the cowls 147 and the rear manifold 188 and the transfer line 402 passes in turn through one of the cowls 147 to rejoin the inside of the cowls 147 and the injector manifold 184. Thus, a single hole is enough in the cowls 147 to run the radially angled section 404 through and one is enough for the transfer line 402.

Such an arrangement makes it possible in addition, in case of leakage on one of the bypass lines 186, for the dihydrogen to be discharged to the outside.

To improve the aerodynamics of the propulsive assembly 151, the latter comprises an outer cowl 406 fixed onto the outside of the cowls 147 of the nacelle 149 by covering the front and rear manifolds 188 and 190 and the bypass lines 186. The propulsive assembly 151 then has an air intake 408 at the front of the outer cowl 406, between the latter and the cowls 147 of the nacelle 149 and an outlet 410 at the rear of the outer cowl 406, between the latter and the cowls 147 of the nacelle 149. Thus, the outside air which enters through the air intake 408 will drive any dihydrogen towards the air outlet 410 in the event of a leak.

Figure 6:
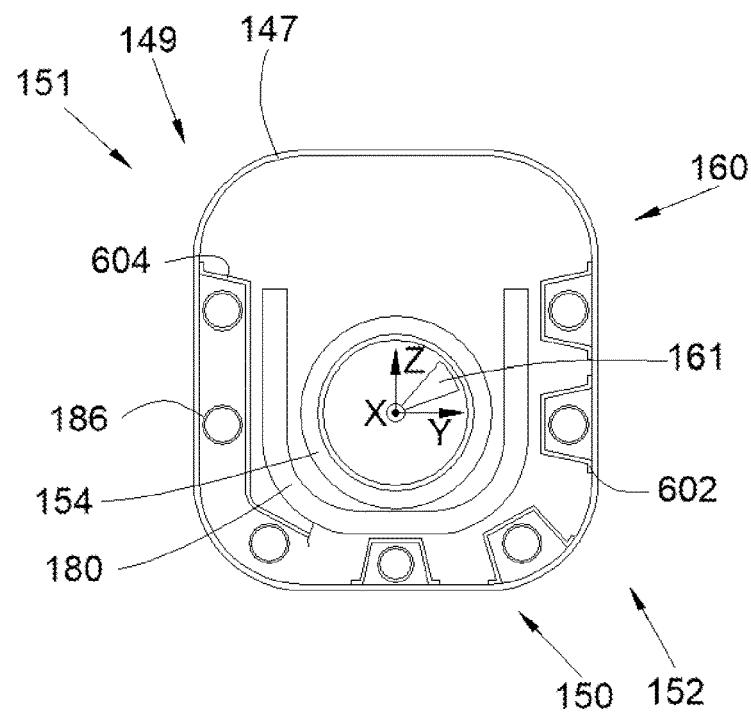
FIG. 6 is a cross-sectional view on a plane normal to the longitudinal axis X for a first variant embodiment of the invention.

FIG. 6 shows an additional protection of the bypass lines 186 which is applied to the embodiment of FIG. 3 but which can also be applied to the embodiment of FIG. 4.

The propulsive assembly 151 comprises at least one gutter 602, 604 which extends over at least the length of the turbine 160 and which is fixed to the cowls 147 of the nacelle 149 and inside the latter. In the embodiment of FIG. 4, said at least one gutter 602, 604 is fixed to the outer cowl 406 and inside the latter. Generally, said at least one gutter 602, 604 is fixed to the outermost cowl 147, 406 and inside the latter.

At least one bypass line 186 is housed in said at least one gutter 602, 604. Thus, each bypass line 186 is protected additionally by the gutter 602, 604 in the event of ejection of debris from the turbine 160.

In the righthand part of FIG. 6, there is a gutter 602 for each bypass line 186 and in the lefthand part, there is a single gutter 604 which encompasses all the bypass lines 186 by running around the frame 180.

Figure 7:
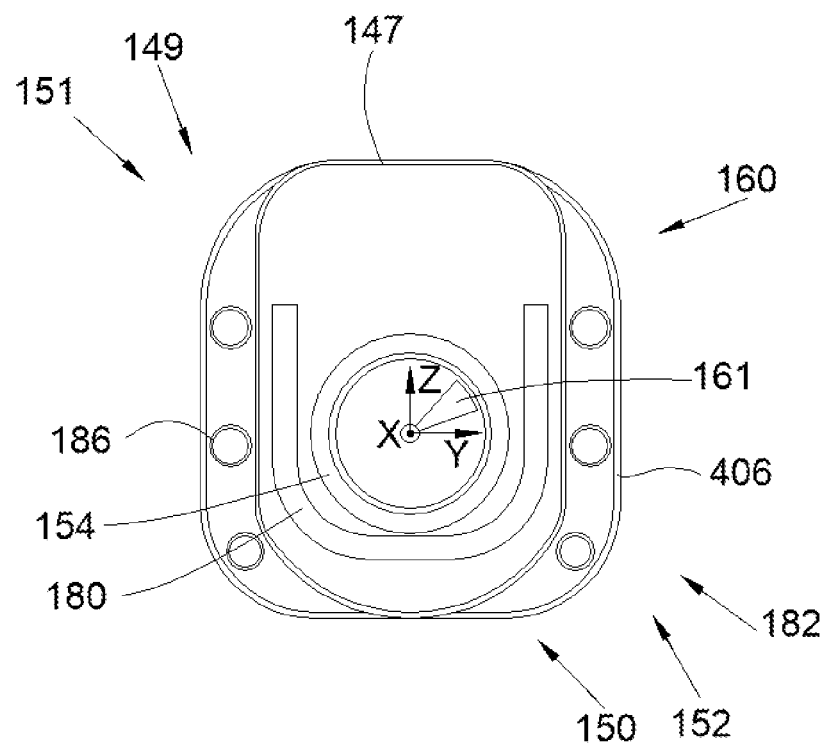
FIG. 7 is a view similar to FIG. 6 for a second variant embodiment of the invention.

FIG. 7 shows a cross section of the embodiment of FIG. 4 in which the bypass lines 186 are housed between the cowls 147 of the nacelle 149 and the outer cowl 406. According to a particular embodiment, the propulsive assembly 151 comprises at least one dihydrogen detector 196 which is arranged in the vicinity of the bypass lines 186 and connected to a control unit 194 which controls ignition of at least one ignition means 192 which is disposed in the vicinity of the bypass lines 186.

Thus, based on data transmitted by said at least one detector 196, the control unit 194 commands the ignition of said at least one ignition means 192 (when dihydrogen is detected).

The ignition means 192 generates at least one spark which fires the dihydrogen in order to burn it without it exploding. Thus, when dihydrogen is detected by a dihydrogen detector 196, the control unit 194 commands the ignition means 192 for it to generate a spark.

Although this particular embodiment is explained on the basis of the embodiment of FIG. 4, it applies likewise to the embodiment of FIG. 3.

To limit the flow rate of dihydrogen in the event of cutting of a bypass line 186, each is equipped with a flow rate regulator.

In the embodiments of FIGS. 3 and 5, the bypass lines 186 and the rear manifold 188 are only disposed on the port side but it is possible to also arrange bypass lines 186 and a rear manifold 188 on the starboard side which can be common to or distinct from the port-side rear manifold 188, in the latter case, as is represented in FIGS. 6 and 7, and there is a supply line 170 for each rear manifold 188.

In the embodiment of FIG. 5, there is only one port-side front manifold 190. However, as previously, it is possible to also arrange a front manifold 190 on the starboard side which can be common to or distinct from the port-side front manifold 190.

In the embodiments of FIGS. 3 and 5, there is a single injector manifold 184 which runs all around the casing 154, but it is also possible to have two independent injector manifolds 184, one on the port side and one on the starboard side, and there are then bypass lines 186 on the port and starboard sides to supply each injector manifold 184.

According to one embodiment, the control unit 194 comprises, linked by a communication bus: a processor or CPU (Central Processing Unit); a Random-Access Memory RAM; a Read-Only Memory ROM; a storage unit such as a hard disc or a storage medium reader, such as an SD (Secure Digital) card reader; at least one communication interface that makes it possible for example for the control unit to communicate with the detectors, the ignition means, etc.

The processor is capable of executing instructions loaded into the RAM from the ROM, from an external memory (not represented), from a storage medium (such as an SD card), or from a communication network. When the equipment is powered up, the processor is capable of reading instructions from the RAM and of executing them. These instructions form a computer program causing the implementation, by the processor, of all or part of the algorithms and steps described.

All or part of the algorithms and steps described hereinbelow can be implemented in software form through the execution of an instruction set by a programmable machine, for example a DSP (Digital Signal Processor) or a microcontroller, or be implemented in hardware form by a dedicated machine or component, for example an FPGA (Field-Programmable Gate Array) or an ASIC (Application-Specific Integrated Circuit).

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A propulsive assembly for an aircraft comprising:
a nacelle composed of cowls,
an engine system housed in the nacelle and comprising a core enclosed in a casing and having a combustion chamber and a turbine provided with blades rotating about a longitudinal axis,
a supply line configured to convey dihydrogen and winding outside the casing to the rear of the turbine,
an injector manifold arranged around the casing and the combustion chamber and equipped with injectors which dip into the combustion chamber through the casing, and
a distribution network which comprises several bypass lines distributed angularly around the casing, a rear manifold fluidically connected to the supply line and to each bypass line and a front manifold fluidically connected to each bypass line and to the injector manifold,
wherein the rear manifold is at a rear of the turbine and the front manifold is at a front of the turbine.

2. The propulsive assembly according to claim 1, wherein the turbine comprises several rotary discs and each disc comprises several blades, and
wherein a separation between two adjacent bypass lines is at least equal to a third of a diameter of a largest disc of the turbine.

3. The propulsive assembly according to claim 1, wherein the front manifold comprises the injector manifold and wherein the front and rear manifolds and the several bypass lines are housed inside the cowls of the nacelle.

4. The propulsive assembly according to claim 3, further comprising:
at least one gutter fixed to an outermost cowl and inside the outermost cowl,
wherein said at least one gutter extends over at least a length of the turbine, and
wherein at least one bypass line is housed in said at least one gutter.

5. The propulsive assembly according to claim 1, wherein the front and rear manifolds and the several bypass lines are disposed outside the cowls,
wherein the supply line is housed inside the cowls and has a radially angled section which passes through one of the cowls to rejoin the rear manifold, and
wherein the propulsive assembly comprises a transfer line which fluidically links the front manifold and the injector manifold through one of the cowls of the nacelle.

6. The propulsive assembly according to claim 5, further comprising:
an outer cowl fixed onto the outside of the cowls of the nacelle by covering the front and rear manifolds and the several bypass lines,
an air intake at the front of the outer cowl, between the outer cowl and the cowls of the nacelle, and
an outlet at a rear of the outer cowl, between the outer cowl and the cowls of the nacelle.

7. The propulsive assembly according to claim 6, further comprising:
at least one gutter fixed to an outermost cowl and inside the outermost cowl,
wherein said at least one gutter extends over at least a length of the turbine, and
wherein at least one bypass line is housed in said at least one gutter.

8. An aircraft comprising:
a wing,
a dihydrogen tank, and
at least one propulsive assembly according to claim 1,
wherein said at least one propulsive assembly is fixed under the wing, and
wherein the supply line is fluidically connected to the dihydrogen tank.

* * * * *